United States Patent
Petit et al.

(10) Patent No.: US 12,088,668 B2
(45) Date of Patent: Sep. 10, 2024

(54) CENTRALIZED MANAGEMENT OF CONTAINERIZED APPLICATIONS DEPLOYED ON DISTRIBUTED GATEWAYS

(71) Applicant: Siemens Industry Software Inc., Plano, TX (US)

(72) Inventors: Emmanuel Petit, Chevreuse (FR); Farrukh Arshad, Lahore (PK); Abdul Basit, Haroon Abad. (PK)

(73) Assignee: Siemens Industry Software Inc., Plano, TX (US)

( * ) Notice: Subject to any disclaimer, the term of this patent is extended or adjusted under 35 U.S.C. 154(b) by 190 days.

(21) Appl. No.: 17/297,686

(22) PCT Filed: Aug. 23, 2019

(86) PCT No.: PCT/US2019/047852
§ 371 (c)(1),
(2) Date: May 27, 2021

(87) PCT Pub. No.: WO2020/112187
PCT Pub. Date: Jun. 4, 2020

(65) Prior Publication Data
US 2022/0046095 A1 Feb. 10, 2022

(51) Int. Cl.
*H04L 12/70* (2013.01)
*H04L 12/66* (2006.01)
(Continued)

(52) U.S. Cl.
CPC .............. *H04L 67/12* (2013.01); *H04L 12/66* (2013.01); *H04L 67/561* (2022.05)

(58) Field of Classification Search
CPC ....... H04L 67/12; H04L 12/66; H04L 67/561; H04W 4/70
(Continued)

(56) References Cited

U.S. PATENT DOCUMENTS

2014/0195798 A1* 7/2014 Brugger ................ H04L 63/101
713/154
2016/0140176 A1* 5/2016 Chamberlin ........ G06F 16/2455
707/718
(Continued)

FOREIGN PATENT DOCUMENTS

WO 2017035536 A1 3/2017

OTHER PUBLICATIONS

PCT International Search Report and Written Opinion of International Searching Authority mailed Nov. 19, 2019 corresponding to PCT International Application No. PCT/US2019/047852 filed Aug. 23, 2019.

*Primary Examiner* — El Hadji M Sall
*Assistant Examiner* — Elizabeth Kassa

(57) ABSTRACT

This application discloses a server to transmit an embedded application to a remote gateway device. The embedded application, when executed, prompts the remote gateway device to generate application messages including information associated with the execution of the embedded application by the remote gateway device. The server is configured to track the execution of the embedded application in the remote gateway device to determine operational states of the embedded application based, at least in part, on the application messages received from the remote gateway device. The server is configured to generate a parameter message for transmission to the remote gateway device based, at least in part, on the operational states of the embedded application deployed in the remote gateway device. The parameter message is configured to prompt the remote gateway device to transmit an application parameter associated with the execution of the embedded application.

20 Claims, 6 Drawing Sheets

(51) Int. Cl.
*H04L 41/0806* (2022.01)
*H04L 67/12* (2022.01)
*H04L 67/561* (2022.01)
*H04W 48/08* (2009.01)

(58) Field of Classification Search
USPC .......................................................... 709/223
See application file for complete search history.

(56) References Cited

U.S. PATENT DOCUMENTS

| | | | |
|---|---|---|---|
| 2016/0335454 A1* | 11/2016 | Choe | G06Q 30/018 |
| 2017/0060574 A1* | 3/2017 | Malladi | H04W 4/38 |
| 2017/0064042 A1* | 3/2017 | Vora | H04L 41/0895 |
| 2017/0064045 A1* | 3/2017 | Pai | H04W 4/70 |
| 2017/0070361 A1* | 3/2017 | Sundermeyer | H04L 67/025 |
| 2018/0173570 A1* | 6/2018 | Chintalapally | H04L 67/34 |
| 2019/0342179 A1* | 11/2019 | Barnard | G06F 16/27 |
| 2020/0310394 A1* | 10/2020 | Wouhaybi | H04L 67/04 |
| 2021/0306416 A1* | 9/2021 | Mukhopadhyay | H04L 41/12 |

* cited by examiner

CENTRALIZED MANAGEMENT OF CONTAINERIZED APPLICATIONS DEPLOYED ON DISTRIBUTED GATEWAYS

RELATED APPLICATION

This patent application is a National Stage of International Application No. PCT/US2019/047852, filed Aug. 23, 2019, which claims priority to U.S. Provisional Patent Application No. 62/772,009, filed Nov. 27, 2018, which is incorporated by reference herein.

TECHNICAL FIELD

This application is generally related to Internet of Things (TOT) technology and, more specifically, to centralized management of containerized applications deployed on distributed gateways.

BACKGROUND

Many industries have implemented Internet of Things (TOT) technology, which can connect machinery, sensors, control systems, or the like, in an industrial environment, to cloud-based computers for remote monitoring and control. Many of the machines, sensors, and control systems in the industrial environment can have external interfaces to output information corresponding to their operations to a cloud-based server via a gateway acting as a protocol translator for transmissions between the industrial environment and the cloud-based server. For example, the gateway can receive the information output from the machines, sensors, and control systems in the industrial environment in one transmission protocol, and transmit the information to the cloud-based server with a different transmission protocol.

The volume of data generated by the machines, sensors, and control systems in the industrial environment can be enormous, which, if uploaded to a cloud-based system, can be costly in the consumption of both memory and processing resources. Some industrial environments include specially-programmed gateways, which can filter or aggregate the data received from the machines, sensors, and control systems in an attempt to reduce the volume of data uploaded to the cloud-based server for subsequent processing.

SUMMARY

This application discloses a server having a computing system to transmit an embedded application to a remote gateway device. The embedded application, when executed, prompts the remote gateway device to generate application messages including information associated with the execution of the embedded application by the remote gateway device. The server can track the execution of the embedded application in the remote gateway device to determine operational states of the embedded application based, at least in part, on the application messages received from the remote gateway device. In some embodiments, the server can develop a model of the embedded application deployed in the remote gateway device that mimics the operational states of the embedded application deployed in the remote gateway device.

The server can generate a parameter message for transmission to the remote gateway device based, at least in part, on the operational states or model of the embedded application deployed in the remote gateway device. The parameter message can be configured to prompt the remote gateway device to transmit an application parameter associated with the execution of the embedded application to the server or to a different remote gateway device. In some embodiments, the server can update the model of the embedded application deployed in the remote gateway device with the application parameter in the parameter message received by the server. By developing a model of the execution of the embedded application in the remote gateway device, the server can orchestrate functionality across multiple distributed remote gateway devices.

The parameter message also can include a parameter value for the remote gateway device to utilize during the execution of the embedded application, for example, updating the embedded application deployed in the remote gateway device. By developing a model of the execution of the embedded application in the remote gateway device, the server can dynamically update the embedded application without having to deploy a different embedded application to the remote gateway device. Embodiments will be described in greater detail below.

DETAILED DESCRIPTION

Illustrative Operating Environment

Figure 1:
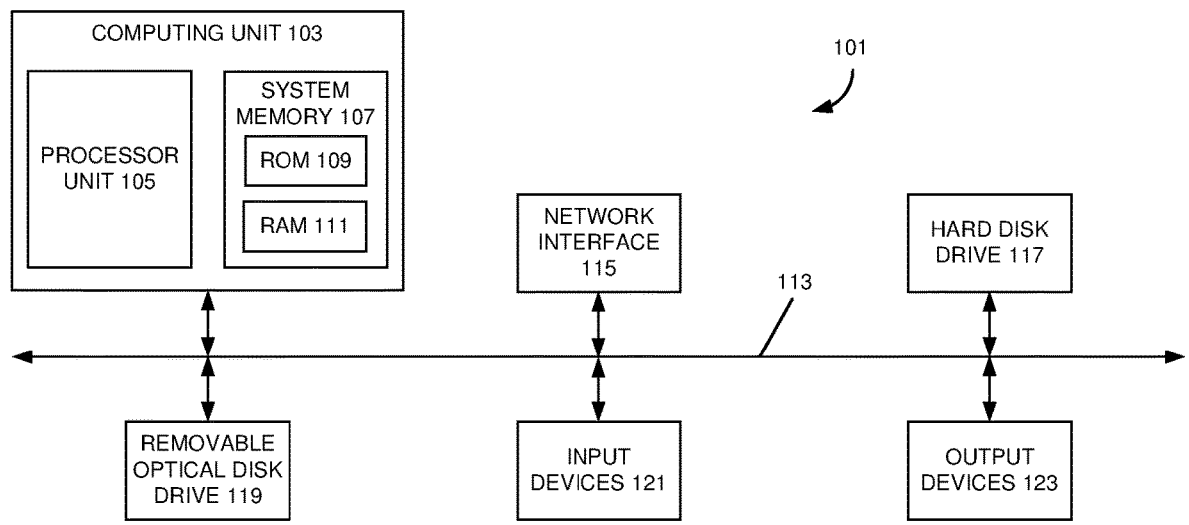
FIGS. 1 and 2 illustrate an example of a computer system of the type that may be used to implement various embodiments.

Various embodiments may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
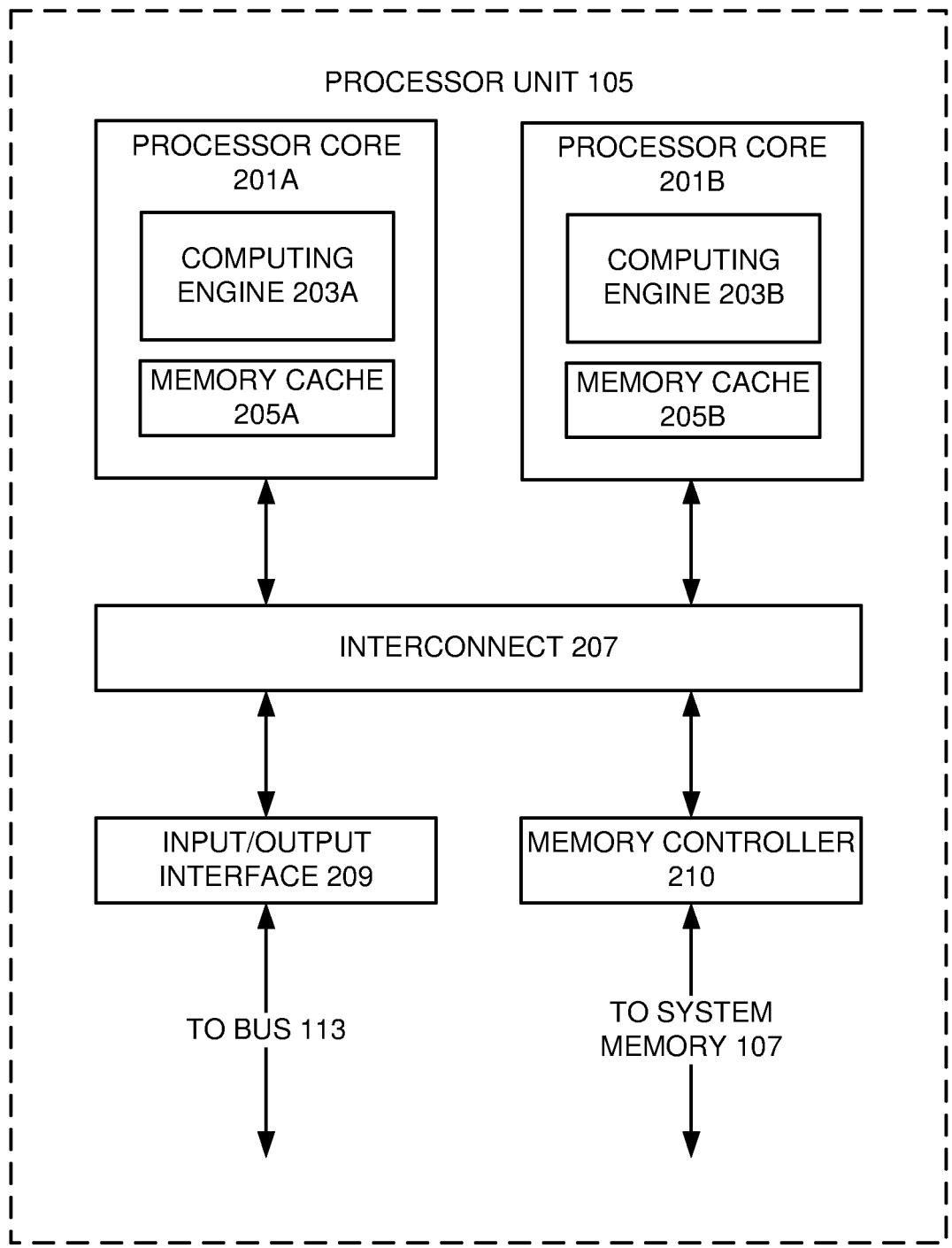

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Internet of Things (IOT) in an Industrial Environment

Figure 3:
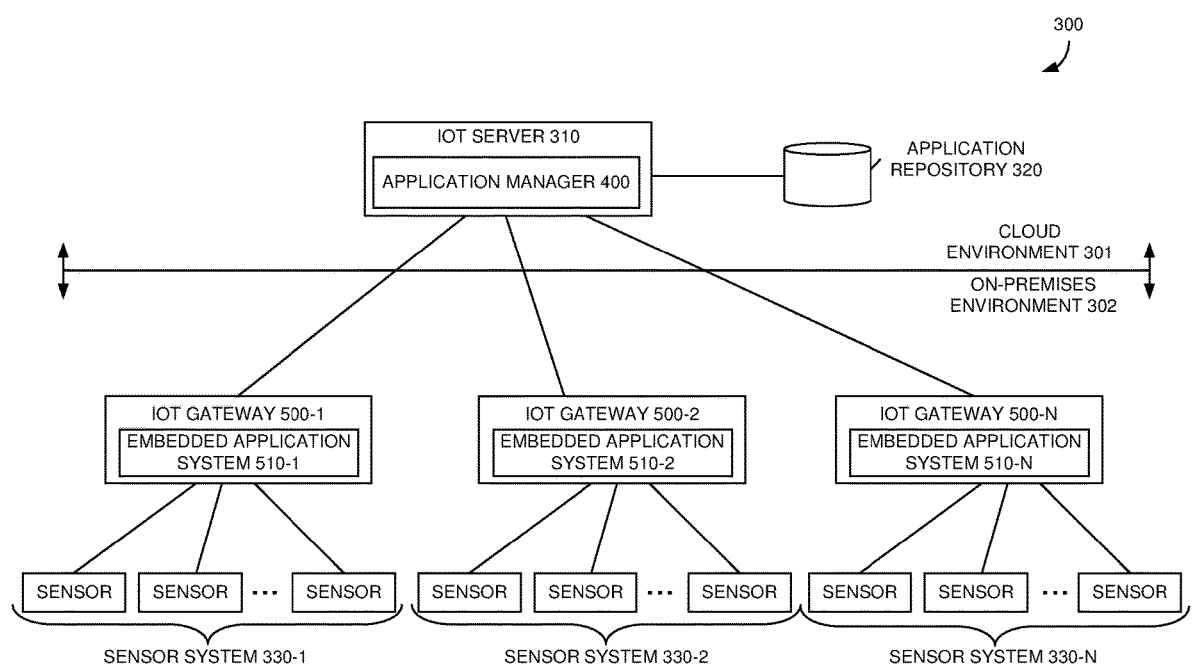
FIG. 3 illustrates an example of an Internet of Things (IOT) system implemented in a cloud environment and an on-premises environment according to various embodiments.

FIG. 3 illustrates an example of an Internet of Things (IOT) system 300 implemented in a cloud environment 301 and an on-premises environment 302 according to various embodiments. Referring to FIG. 3, the on-premises environment 302 of the IOT system 300 can include multiple sensor systems 330-1 to 300-N, each including one or more sensors or other devices capable of communicating with one or more IOT gateways 500-1 to 500-N. In some embodiments, the sensor system 330-1 can communicate with the IOT gateway 500-1, the sensor system 330-2 can communicate with the IOT gateway 500-2, and the sensor system 330-N can communicate with the IOT gateway 500-N. In other embodiments, one or more of the sensor systems 330-1 to 330-N can communicate with a plurality of the IOT gateways 500-1 to 500-N.

In a manufacturing environment, such as a factory floor or multiple distributed factories, the sensors in the sensor systems 330-1 to 330-N can gather information corresponding to the manufacturing of a product, for example, by identifying operations or operational states of manufacturing equipment, manufacturing lines, the manufacturing of products, inventory, testing or verification procedures for the products, or the like. The sensors in the sensor systems 330-1 to 330-N can transmit the gathered information towards an IOT server 310 via one or more of the IOT gateways 500-1 to 500-N.

The IOT gateways 500-1 to 500-N can include embedded application systems 510-1 to 510-N, respectively, to process the information received from the sensor systems 330-1 to 330-N. The embedded application systems 510-1 to 510-N can determine states of the machinery, manufacturing lines, equipment, products, inventory, or the like, based on the information received from the sensor system 330-1 to 330-N. The embedded application systems 510-1 to 510-N can generate messages based on the determined states and transmit the messages to the IOT server 310. In some embodiments, the embedded application systems 510-1 to 510-N can perform local data processing, such as local encryption operations, data protection, the execution of a neural network for sensors data inference, or the like. The embedded application systems 510-1 to 510-N also can implement a local control loop for triggering or actuating manufacturing equipment, which allows for on-premises control to reduce cloud-based latency and to preserve data and manufacturing process confidentiality.

The IOT gateways 500-1 to 500-N can include a processing systems configured to execute instructions corresponding to embedded applications, which can prompt the processing systems to analyze the information received from the sensor systems 330-1 to 330-N, generate the messages, and transmit the messages to the IOT server 310. In some embodiments, the IOT gateways 500-1 to 500-N can receive embedded application metadata and the embedded applications as embedded application images from the IOT server 310 located in the cloud environment 310. The embedded application metadata can include deployment configurations for the embedded applications in the IOT gateways 500-1 to 500-N. The embedded application systems 510-1 to 510-N can implement Docker engines to execute the embedded application images based on the configurations described in the embedded application metadata. The embedded application images can be standalone, executable embedded applications, which can include executable code, runtime, system tools, system libraries, settings, or the like, utilized by the Docker engines to implement the embedded applications corresponding to the embedded application images. In some embodiments, the Docker engines can generate containers for the embedded application images and execute the containers having the embedded application images to implement the embedded applications.

The IOT server 310 can include an application manager 400 to deploy the embedded application images to the IOT gateways 500-1 to 500-N. In some embodiments, the application manager 400 can select an embedded application to implement in one of the IOT gateways 500-1 to 500-N, for example, from an application repository 320 located in the cloud environment 302, and deploy embedded application metadata and an embedded application image associated with the selected embedded application to the corresponding IOT gateways 500-1 to 500-N. The addition of embedded application systems 510-1 to 510-N to the IOT gateways 500-1 to 500-N, respectively, can allow for deployment of the embedded application images by the application manager 400 to the IOT gateways 500-1 to 500-N, which can allow the IOT server 310 to centrally control a flow of information gathered by the sensor systems 330-1 to 330-N to the IOT server 310.

The application manager 400 in the IOT server 310 also can orchestrate various operations performed by the embedded application systems 510-1 to 510-N in the IOT gateways 500-1 to 500-N, respectively. For example, the application manager 400 can utilize the embedded application systems 510-1 to 510-N to off-load processing from the cloud environment 301 to the IOT gateways 500-1 to 500-N in the on-premises environment 302. In some embodiments, the application manager 400 in the IOT server 310 can identify processing and/or memory resources in the IOT gateways 500-1 to 500-N that remain after implementing embedded application images for the communication of information gathered by the sensor systems 330-1 to 330-N. The application manager 400 can utilize the remaining processing and/or memory resources in the IOT gateways 500-1 to 500-N to off-load processing from the cloud environment 301 to the on-premises environment 302. For example, the application manager 400 can select an embedded application from the application repository 320 corresponding to the operations to be off-loaded to the IOT gateways 500-1 to 500-N and deploy the embedded application to the corresponding IOT gateways 500-1 to 500-N.

In another example, the application manager 400 also can orchestrate the import or export of parameters in the embedded application implemented by the embedded application systems 510-1 to 510-N. The parameters in the embedded application can correspond to values coded in the embedded application or values determined by the embedded application during execution. For example, when the embedded application corresponds to a temperature monitoring application that utilizes a temperature reading from a sensor to determine a rate of temperature change over a preset time period and then generates a message when the rate of temperature change exceeds a threshold value, the parameters can correspond to the rate of temperature change and the threshold value. In this example, the application manager 400 can send a parameter message to one of the IOT gateways 500-1 to 500-N implementing the temperature monitoring application, which can include a parameter for the corresponding embedded application systems 510-1 to 510-N to import into the temperature monitoring application, such as a parameter corresponding to a different threshold value. The application manager 400 also can send a parameter message to one of the IOT gateways 500-1 to 500-N implementing the temperature monitoring application, which can prompt the corresponding embedded application systems 510-1 to 510-N to export a parameter from the temperature monitoring application, such as a parameter corresponding to a threshold value or the rate of temperature change.

The application manager 400 also can orchestrate the import or export of parameters in the embedded application by implementing an avatar, a digital twin, a cloud clone, or the like, of the embedded application running on the embedded application systems 510-1 to 510-N and then transmitting parameter messaging to the embedded application systems 510-1 to 510-N. In some embodiments, the parameter messaging can prompt the embedded application systems 510-1 to 510-N to import a parameter from the IOT server 310, which can allow the application manager 400 to modify the embedded application implemented by one or more of embedded application systems 510-1 to 510-N without having to deploy a different embedded application to the IOT gateways 500-1 to 500-N.

The parameter messaging also can prompt the embedded application systems 510-1 to 510-N to import or export parameters to other cloud-coupled devices, such as other IOT gateways 500-1 to 500-N. The application manager 400 can orchestrate the sharing of parameters across the distributed IOT gateways 500-1 to 500-N with the parameter messaging, which can allow the IOT gateways 500-1 to 500-N to operate in conjunction with each other. The IOT server 310 can deploy multiple embedded applications to one or more of the IOT gateways 500-1 to 500-N to implement a containerized service with different portions of the containerized service being performed by different embedded applications. The parameter sharing functionality orchestrated by the IOT server 310 can allow the different embedded applications to interact and perform operations conjunctively to implement the containerized service. Embodiments of the application manager and the embedded application system will be described below in greater detail.

Figure 4:
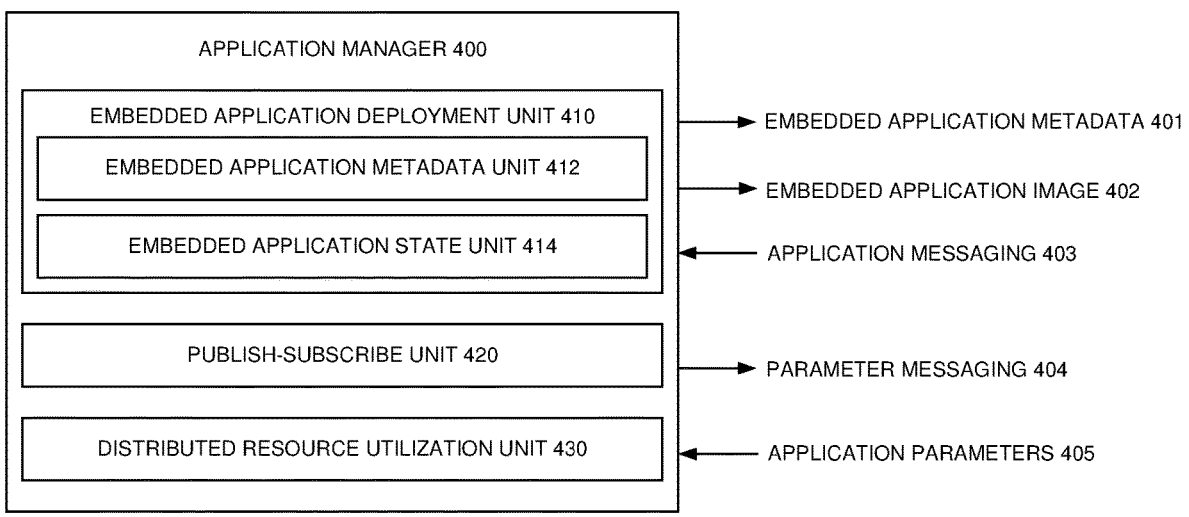
FIG. 4 illustrates an example of an application manager in an IOT server according to various embodiments.

FIG. 4 illustrates an example of an application manager 400 in an IOT server according to various embodiments. Referring to FIG. 4, the IOT server including the application manager 400 can be located in a cloud environment and be configured to communicate with devices located in an on-premises environment or in a different cloud environment. The application manager 400 can include an embedded application deployment unit 410 to select embedded applications for deployment on IOT gateways in an on-premises environment. In some embodiments, the application manager 400 can select the embedded applications based on input received from a remote user terminal or based on an internal programming. The application manager 400 can retrieve embedded application metadata 401 and an embedded application image 402 corresponding to the selected embedded application from a memory device, such as an application repository located in the cloud environment or another memory system accessible by the IOT server.

The embedded application deployment unit 410 can include an embedded application metadata unit 412 to identify embedded application metadata 401 and the embedded application image 402 corresponding to the selected embedded application. The embedded application metadata unit 412 can transmit the embedded application metadata 401 towards the IOT gateway over a communication network, such as packet-switched network, a circuit-switched network, a combination thereof, or the like. The IOT gateway can utilize the embedded application metadata 401 to download the embedded application image 402 from the IOT server and execute the embedded application image 402, for example, with a Docker engine or the like, to implement the embedded application on the IOT gateway.

The implementation of the embedded application can prompt the IOT gateway to generate application messages 403, which the IOT gateway can transmit to the IOT server over the communication network. The application messages 403 can include information the IOT gateways generated, aggregated, filtered, or the like, in response to the execution of the embedded application. For example, when the IOT gateway receives industrial measurement data, the application messaging 403 can include a subset of the industrial measurement data, an aggregated report of the industrial measurement data, an indication that the IOT gateway detected an event from industrial measurement data, or the like.

The embedded application deployment unit 410 can include an embedded application state unit 414 to model states of the embedded applications deployed on IOT gateways based, at least in part, on the application messages 403 received from the IOT gateways. The embedded application state unit 414 can model the states of the embedded application by storing instances of embedded application images 402 capable of being deployed by the application manager 400, instances of embedded application images having been deployed, identifiers of IOT gateways having been commissioned to receive embedded application images 402 from the application manager 400, parameters supported by the embedded application images 402, values of the parameters supported by the embedded application images 402, or the like. The embedded application state unit 414 can update the model of the embedded applications on the IOT gateways when a new embedded application image 402 has been deployed to or released from an IOT gateway, based on contents of the application messages 403 from the IOT gateways implementing the embedded applications, or the like. In some embodiments, the model of the embedded application can correspond to an avatar, a digital twin, a cloud clone, or the like, of the deployed embedded application images 402 on the IOT gateways, which can mimic the operational states of the deployed embedded application images 402 as implemented on the IOT gateways. For example, when an IOT gateway implements a sound classification embedded application, the embedded application state unit 414 can generate a model of the sound classification embedded application that identifies the IOT gateway, identifies the sound classification embedded application has been deployed on the IOT gateway, identifies the parameters associated with the sound classification embedded application, identifies the values of the parameters, or the like.

The application manager 400 can include a publish-subscribe unit 420 to generate parameter messaging 404, which can prompt the IOT gateways to import or export parameters associated with embedded applications implemented by the IOT gateways. Since the embedded application state unit 414 can include a model of the embedded application deployed in the IOT gateway, the publish-subscribe unit 420 can generate parameter messaging 404 to import or export parameters associated with the embedded application. In some embodiments, the publish-subscribe unit 420 can include parameter values in the parameter messaging 404 and the IOT gateways can import the parameter values into the embedded applications. The ability to import of parameter values into the embedded applications can allow the IOT server to remotely modify a deployed embedded application image 402 without having to release the already deployed embedded application image 402 and deploy new embedded application metadata 401 with a modified embedded application image 402.

The publish-subscribe unit 420 can generate parameter messaging 404 that, when provided to the IOT gateway, can prompt the IOT gateway to export a parameter value as application parameters 405. The IOT gateway can transmit the application parameters 405 to the application manager 400 in the IOT server, which can utilize the parameter values to update the model of the embedded application. In some embodiments, the publish-subscribe unit 420 can retransmit the application parameters 405 to a different networking device or cloud platform, for example, to a networking device subscribed to receive the parameter value(s) exported from the IOT gateway in the application parameters 405. In some embodiments, the parameter messaging 404 can specify where the IOT gateway should export the application parameters 405, for example, identify a networking device to receive the application parameters 405. The publish-subscribe unit 420 may utilize the models of the embedded applications to identify and track which parameter values to export from which embedded applications and which networking devices, such as other IOT gateways subscribe to receive the parameter values. The publish-subscribe unit 420 can generate the parameter messaging 404 to prompt an import of parameters from the embedded applications implemented on the IOT gateways, to prompt an export of parameters from the embedded applications implemented on the IOT gateways, to prompt the embedded applications implemented on the IOT gateways share parameters between themselves, or the like.

The application manager 400 can include a distributed resource utilization unit 430 to utilize multiple distributed IOT gateways to implement complex services, for example, by coordinating the deployment of embedded applications to the IOT gateways, while utilizing the models of the deployed embedded applications along with the publish-subscribe technology to have the embedded applications communicate with each other across the distributed IOT gateways. For example, the application manager 400 can utilize the distributed resource utilization unit 430 and the publish-subscribe unit 420 to coordinate deployment of embedded applications to the IOT gateways and direct dynamic exchange of data between the deployed embedded applications to implement a containerized service. By modeling the states of the embedded applications and coordinating the sharing of parameter values across distributed IOT gateways, the application manager 400 can direct the distributed IOT gateways to implement complex computing tasks or provide complex services, for example, unable to be performed by an individual IOT gateway.

In some embodiments, the distributed resource utilization unit 430 can off-load processing from the cloud environment to one or more of the IOT gateways in the on-premises environment. In some embodiments, the application manager 400 in the IOT server can identify available processing and/or memory resources in the IOT gateways, deploy embedded applications that, when executed by the IOT gateways having available processing and/or memory resources, can perform the off-loaded processing from the cloud environment. The distributed resource utilization unit 430 can work in conjunction with the embedded application state unit 414 and the publish-subscribe unit 420 to enable multiple IOT gateways implementing the off-loaded processing to communicate parameters with each other. When multiple IOT gateways implement the off-loaded processing, the distributed resource utilization unit 430 can utilize the embedded application state unit 414 to generate models for the embedded applications to implement the off-loaded processing, and utilize the publish-subscribe unit 420 to configure parameter messaging 404 prompting exchange of parameters between the IOT gateways in order to accomplish their processing tasks.

Figure 5:
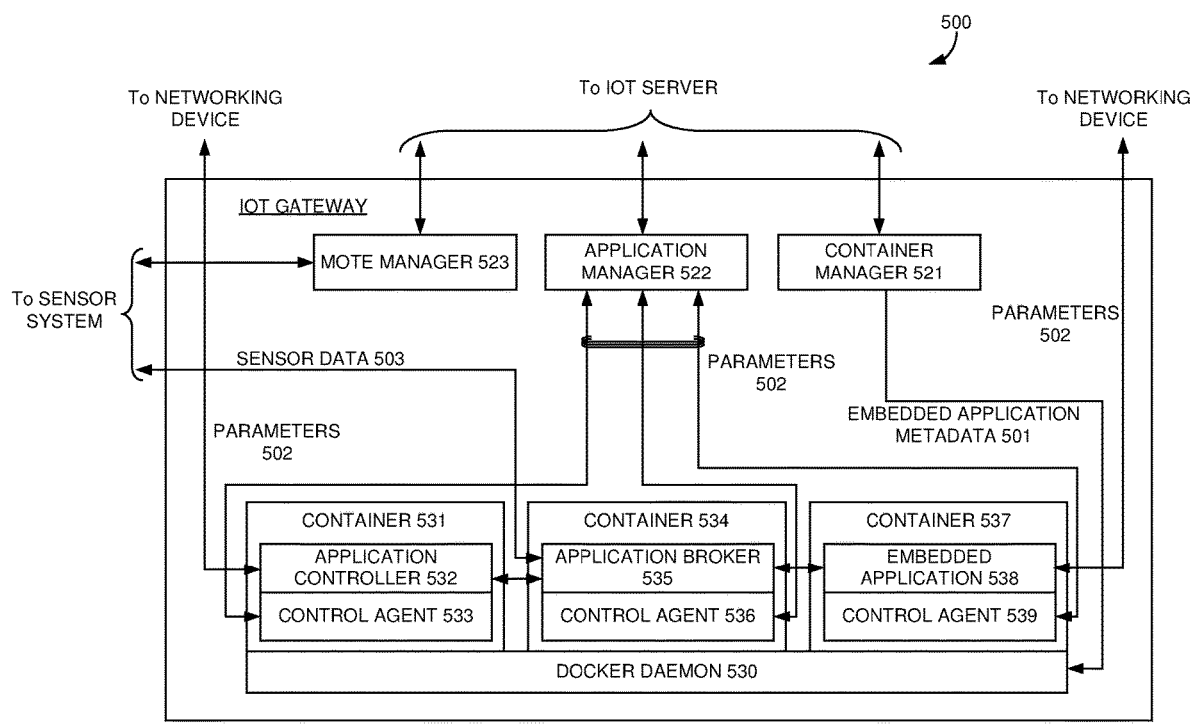
FIG. 5 illustrates an example of an IOT gateway according to various embodiments.

FIG. 5 illustrates an example of an IOT gateway 500 with multiple deployed embedded applications according to various embodiments. Referring to FIG. 5, the IOT gateway 500 can include a container manager 521 to receive embedded application metadata 501 from an IOT server, for example, located in a cloud environment. The embedded application metadata 501 can include deployment configurations for the embedded application images corresponding to embedded applications for deployment on the IOT gateway 500. The container manager 521 can provide the embedded application metadata 501 to Docker daemon 530 in the IOT gateway 500, which can download the embedded application images from the IOT server based on the embedded application metadata 501 and implement a Docker engine to generate containers 531, 534, and 537 for execution of the embedded application images.

In the instant example, the Docker daemon 530 can have a Docker engine capable of supporting embedded applications corresponding to multiple containers 531, 534, and 537. The container 531, when implemented by the Docker daemon 530, can execute an embedded application image and implement an application controller 532. The container 531 also can include a control agent 533 to communicate parameters 502 associated with the application controller 532 to the IOT server via an application manager 522. In some embodiments, the control agent 533 can include a messaging application to communicate with the application manager 522 to import and export parameter values associated with the container 531 and the application controller 532. The container 534, when implemented by the Docker daemon 530, can execute an embedded application image and implement an application broker 535. The container 534 also can include a control agent 536 to communicate parameters 502 associated with the application broker 535 to the IOT server via the application manager 522. In some embodiments, the control agent 536 can include a messaging application to communicate with the application manager 522 to import and export parameter values associated with the container 534 and the application broker 535. The container 537, when implemented by the Docker daemon 530, can execute an embedded application image and implement an embedded application 538. The container 537 also can include a control agent 539 to communicate parameters 502 associated with the embedded application 538 to the IOT server via the application manager 522. In some embodiments, the control agent 539 can include a messaging application to communicate with the application manager 522 to import and export parameter values associated with the container 537 and the embedded application 538.

The application manager 522 can receive parameter messages from the IOT server, for example, requesting to import or export parameters 502 from the containers 531, 534, or 537. The application manager 522 can identify which of the containers 531, 534, or 537 to send the parameter messages and transmit the parameter messages to the control agents 533, 536, or 539 corresponding to the identified containers 531, 534, or 537. In some embodiments, the control agents 533, 536, or 539, in response to the parameter messages, can import a parameter value from the parameter messages. The control agents 533, 536, or 539 also can direct an export of a parameter 502 in response to the parameter messages. In some embodiments, the control agents 533, 536, or 539 can export parameters 502 to the application manager 522 for transmission to the IOT server in response to the parameter messages. The control agents 533, 536, or 539 also can prompt the corresponding embedded applications, such as application controller 532 or embedded application 538, to export parameters 502 to a networking device, such as the IOT server, a different IOT gateway, a cloud environment, or the like.

The IOT gateway 500 can include a mote manager 523 to communicate with a sensor system, for example, having one or more sensors located in an industrial environment. The mote manager 523 can receive messaging from an IOT server, for example, located in a cloud environment. In some embodiments, the messaging can include configuration data for the sensor system, and the mote manager 523 can forward the messaging to the sensor system or prompt the configuration of the sensor system based on the configuration data. The mote manager 523 also can receive information from the sensor system and forward the information to the IOT server, for example, generate messaging that includes the information and transmit the messaging to the IOT server. In some embodiments, the mote manager 523 can convert a physical layer communication protocol from the sensors, such as Bluetooth, Thread, WiFi, LoRa, Universal Serial Bus (USB), near-field communication (NFC), serial, or the like, and a mote application protocol, such as Constrained Application Protocol (CoAP), Message Queuing Telemetry Transport (MQTT), or the like, into an internet connection protocol, such as Hypertext Transfer Protocol Secure (HTTPS) over Ethernet or the like. This protocol conversion by the mote manager 523 can allow the IPT gateway 500 to relay and mediate communication between the sensors or other mote and the IOT server or other device in the cloud environment.

The IOT gateway 500 executing the embedded application images in the containers 531, 534, and 537 can implement a complex system, such as an industrial monitoring system utilizing sensor data 503 from the sensor system. The application broker 535 can receive the sensor data 503 from the sensor system and distribute the sensor data 503 to the application controller 532 and the embedded application 538. In some embodiments, the application controller 532 and the embedded application 538 can be provided the messaging parameters of the application broker 535 via publish-subscribe operation. For example, the IOT server can request parameters 502 associated with the messaging functionality of the application broker 535, which can be provided by the control agent 536 to the IOT server. The IOT server can utilize the publish-subscribe functionality to import the messaging parameters of the application broker 535 to the application controller 532 and the embedded application 538, which can allow the application broker 535 to distribute the sensor data 503 to the application controller 532 and the embedded application 538.

The application controller 532 and the embedded application 538 can analyze the sensor data 503 to monitor an industrial environment. When the application controller 532 and/or the embedded application 538 detect an event based on the analysis of the sensor data 503, such as a machine malfunction, a temperature change, a detected noise, or the like, the application controller 532 and/or the embedded application 538 can generate application messaging for transmission to the IOT server or other networking device. The application messaging can include an indication of the detected event, sensor data 503 corresponding to the detected event, or the like.

Figure 6:
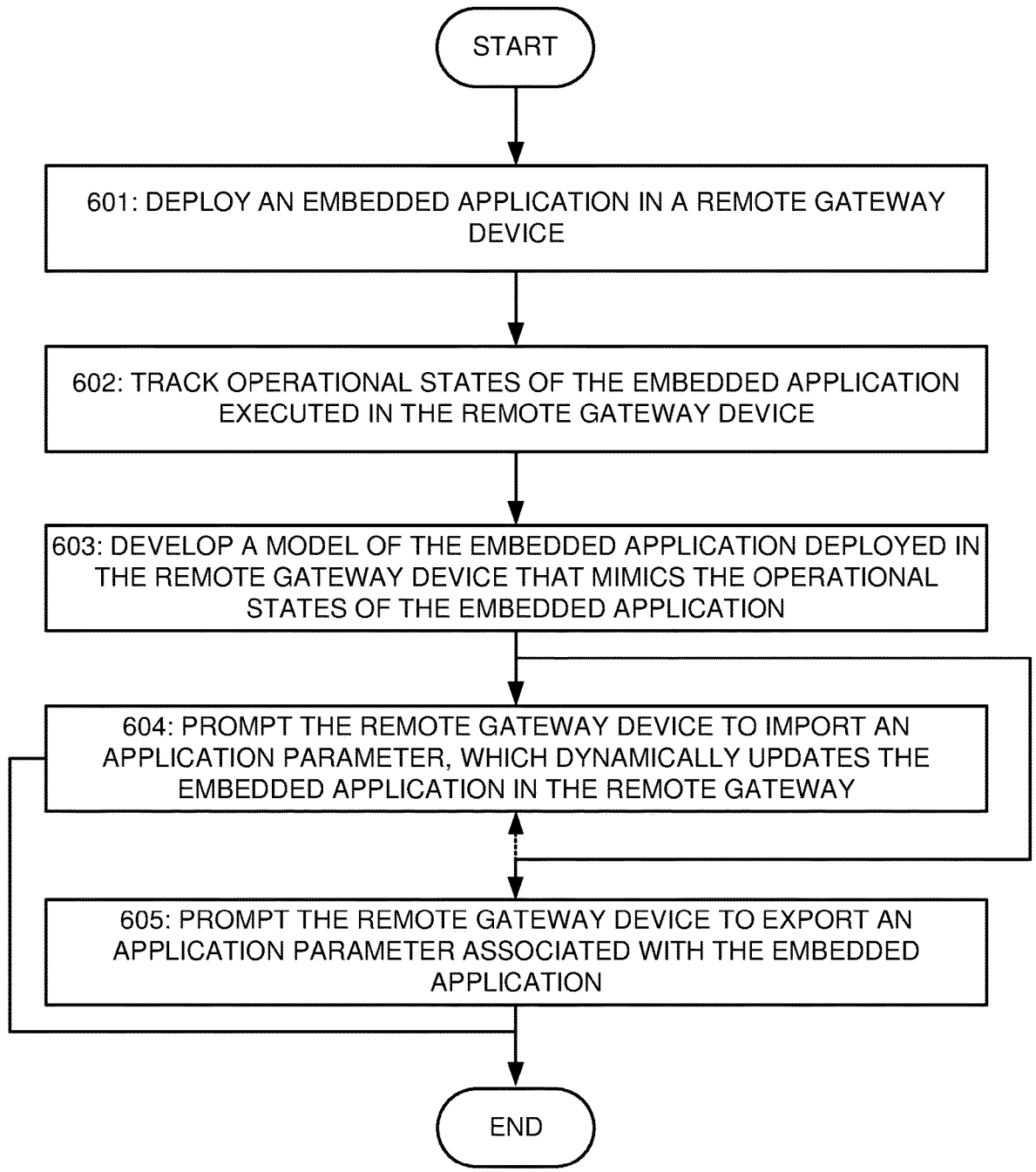
FIG. 6 illustrates an example flowchart implementing management of embedded applications deployed on a remote gateway device, which may be implemented according to various embodiments.

FIG. 6 illustrates an example flowchart implementing management of embedded applications deployed on a remote gateway device, which may be implemented according to various embodiments. Referring to FIG. 6, in a block 601, a server having a computing system can deploy an embedded application in a remote gateway device. The server can select the embedded application for deployment on remote gateway device based on input received from a remote user terminal or based on an internal programming. The server can retrieve embedded application metadata and an embedded application image corresponding to the selected embedded application from a memory device, such as an application repository located in the cloud environment or another memory system accessible by the server.

The server can transmit the embedded application metadata towards the remote gateway device over a communication network, such as packet-switched network, a circuit-switched network, a combination thereof, or the like. The remote gateway device can utilize the embedded application metadata to identify deployment configurations for the embedded application image. The remote gateway device can download the embedded application from the server based on the embedded application metadata and execute the embedded application image, for example, with a Docker engine or the like, to implement the embedded application on the remote gateway device.

In a block 602, the server can track operational states of the embedded application executed in the remote gateway device. The implementation of the embedded application can prompt the remote gateway device to generate application messages, which the remote gateway device can transmit to the server over the communication network. The application messages can include information the remote gateway device generated, aggregated, filtered, or the like, in response to the execution of the embedded application corresponding to the embedded application image.

In a block 603, the server can develop a model of the embedded application deployed in the remote gateway device that mimics the operational states of the embedded application. The server can determine the operational states of the embedded application deployed on the remote gateway device based, at least in part, on the application messages received from the remote gateway device. The server can model the operational states of the embedded application by storing an instance of the embedded application image deployed by the server, parameters supported by the embedded application image, values of the parameters supported by the embedded application image, or the like. The server can update the model of the embedded application on the remote gateway device when a new embedded application image has been deployed to or released from remote gateway device, based on contents of the application messages from the remote gateway device implementing the embedded application, or the like. In some embodiments, the model of the embedded application can correspond to an avatar, a digital twin, a cloud clone, or the like, of the deployed embedded application image on the remote gateway device, which can mimic the operational states of the deployed embedded application image as implemented on the remote gateway device.

In a block 604, the server can prompt the remote gateway device to import an application parameter, which dynamically updates the embedded application in the remote gateway device. In some embodiments, the server can generate a parameter message including the application parameter to be imported into the remote gateway device. In other embodiments, the server may prompt a different networking device, such as a different remote gateway device, to export the application parameter to the remote gateway device. The remote gateway device can import the application parameter in a parameter message received from the different networking device. The remote gateway device can parse the application parameter from the parameter message received from the server or the different networking device, and update the embedded application deployed on the remote gateway device. The ability of the such as a different remote gateway device to import the application parameter and update the embedded application can allow the server to remotely modify a deployed embedded application image without having to release the already deployed embedded application image and deploy a new container with a modified embedded application image.

In a block 605, the server can prompt the remote gateway device to export an application parameter associated with the embedded application. The server can generate a parameter message that, when provided to the remote gateway device, can prompt the remote gateway device to export an application parameter. The server can inform the remote gateway device where to export the application parameter, for example, identify a networking device to receive the application parameter. The remote gateway device can transmit the application parameter to the server, allowing the server to utilize the application parameter to update the model of the embedded application. The server also can retransmit the application parameter to a different networking device or cloud platform, for example, to a networking device subscribed to receive the parameter value(s) exported from the remote gateway device.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
transmitting, by a server including a computing system, an embedded application to a remote gateway device, wherein the embedded application, when executed by the remote gateway device, prompts the remote gateway device to generate application messages including information associated with the execution of the embedded application by the remote gateway device;
tracking, by the server, the execution of the embedded application in the remote gateway device to determine operational states of the embedded application based, at least in part, on the application messages received from the remote gateway device;
utilizing, by the server, the operational states of the embedded application deployed in the remote gateway device to identify an application parameter associated with the execution of the embedded application for the remote gateway device to export; and
generating, by the server, a parameter message for transmission to the remote gateway device based, at least in part, on the identification of the application parameter for the remote gateway device to export, wherein the remote gateway device, in response to the parameter message, transmits the application parameter associated with the execution of the embedded application.

2. The method of claim 1, further comprising developing, by the server, a model of the embedded application deployed in the remote gateway device that mimics the operational states of the embedded application deployed in the remote gateway device.

3. The method of claim 2, further comprising updating, by the server, the model of the embedded application deployed in the remote gateway device with the application parameter in the parameter message received by the server.

4. The method of claim 1, further comprising transmitting, by the server, the application parameter to a different remote gateway device.

5. The method of claim 1, wherein the parameter message includes a parameter value for the remote gateway device to utilize during the execution of the embedded application.

6. The method of claim 1, wherein the remote gateway device transmits the application parameter to a different remote gateway device based on the parameter message.

7. The method of claim 1, wherein transmitting the embedded application to the remote gateway device further comprises transmitting a deployment configuration for the embedded application to the remote gateway device, wherein the remote gateway device downloads an embedded application image corresponding to the embedded application from the server based on the deployment configuration for the embedded application, and wherein the remote gateway device include one or more processing devices implementing a Docker engine to execute the embedded application image corresponding to the embedded application.

8. An apparatus comprising at least one memory device storing instructions that, when executed by one or more processing devices, cause the one or more processing devices to perform operations comprising:
transmitting an embedded application to a remote gateway device, wherein the embedded application, when executed by the remote gateway device, prompts the remote gateway device to generate application messages including information associated with the execution of the embedded application by the remote gateway device;

tracking the execution of the embedded application in the remote gateway device to determine operational states of the embedded application based, at least in part, on the application messages received from the remote gateway device;

utilizing the operational states of the embedded application deployed in the remote gateway device to identify an application parameter associated with the execution of the embedded application for the remote gateway device to export; and generating a parameter message for transmission to the remote gateway device based, at least in part, on the identification of the application parameter for the remote gateway device to export, wherein the remote gateway device, in response to the parameter message, transmits the application parameter associated with the execution of the embedded application.

9. The apparatus of claim 8, wherein the instructions, when executed by the one or more processing devices, further cause the one or more processing devices to perform operations comprising developing a model of the embedded application deployed in the remote gateway device that mimics the operational states of the embedded application deployed in the remote gateway device.

10. The apparatus of claim 9, wherein the instructions, when executed by the one or more processing devices, further cause the one or more processing devices to perform operations comprising updating the model of the embedded application deployed in the remote gateway device with the application parameter in the parameter message received by the server.

11. The apparatus of claim 8, wherein the instructions, when executed by the one or more processing devices, further cause the one or more processing devices to perform operations comprising transmitting the application parameter to a different remote gateway device.

12. The apparatus of claim 8, wherein the parameter message includes a parameter value for the remote gateway device to utilize during the execution of the embedded application.

13. The apparatus of claim 8, wherein the remote gateway device transmits the application parameter to a different remote gateway device based on the parameter message.

14. The apparatus of claim 8, wherein transmitting the embedded application to the remote gateway device further comprises transmitting a deployment configuration for the embedded application to the remote gateway device, wherein the remote gateway device downloads an embedded application image corresponding to the embedded application from the server based on the deployment configuration for the embedded application, and wherein the remote gateway device include one or more processing devices implementing a Docker engine to execute the embedded application image corresponding to the embedded application.

15. A system comprising:
a memory device configured to store machine-readable instructions; and
a computing system including one or more processing devices, in response to executing the machine-readable instructions, to:
transmit an embedded application to a remote gateway device, wherein the embedded application, when executed by the remote gateway device, prompts the remote gateway device to generate application messages including information associated with the execution of the embedded application by the remote gateway device;
track the execution of the embedded application in the remote gateway device to determine operational states of the embedded application based, at least in part, on the application messages received from the remote gateway device;
utilize the operational states of the embedded application deployed in the remote gateway device to identify an application parameter associated with the execution of the embedded application for the remote gateway device to export; and
generate a parameter message for transmission to the remote gateway device based, at least in part, on the identification of the application parameter for the remote gateway device to export, wherein the remote gateway device, in response to the parameter message, transmits the application parameter associated with the execution of the embedded application.

16. The system of claim 15, wherein the one or more processing devices, in response to executing the machine-readable instructions, to develop a model of the embedded application deployed in the remote gateway device that mimics the operational states of the embedded application deployed in the remote gateway device.

17. The system of claim 16, wherein the one or more processing devices, in response to executing the machine-readable instructions, to update the model of the embedded application deployed in the remote gateway device with the application parameter in the parameter message received by the server.

18. The system of claim 15, wherein the one or more processing devices, in response to executing the machine-readable instructions, to transmit the application parameter to a different remote gateway device.

19. The system of claim 15, wherein the parameter message includes a parameter value for the remote gateway device to utilize during the execution of the embedded application.

20. The system of claim 15, wherein the remote gateway device transmits the application parameter to a different remote gateway device based on the parameter message.

* * * * *